United States Patent [19]
Griffin, Jr.

[11] Patent Number: 5,328,106
[45] Date of Patent: Jul. 12, 1994

[54] GLASS GRINDING MACHINE
[75] Inventor: Jerrell J. Griffin, Jr., Honolulu, Hi.
[73] Assignee: J. J. Griffin Environmental, Inc., Honolulu, Hi.
[21] Appl. No.: 111,224
[22] Filed: Aug. 24, 1993
[51] Int. Cl.⁵ .............................................. B02C 19/12
[52] U.S. Cl. ....................................... 241/99; 241/73; 241/100
[58] Field of Search .................. 241/73, 99, 224, 239, 241/240, 241, 24, 100

[56] References Cited
U.S. PATENT DOCUMENTS

| | | | |
|---|---|---|---|
| 811,679 | 2/1906 | Williams | 241/73 |
| 1,035,313 | 8/1912 | Buchanan | 241/241 X |
| 1,973,074 | 9/1934 | Howes, Jr. et al. | |
| 2,558,255 | 6/1951 | Johnson et al. | |
| 3,151,814 | 10/1964 | Morgan et al. | |
| 3,224,688 | 12/1965 | Beiter | |
| 3,655,138 | 4/1972 | Luscombe | |
| 3,703,970 | 11/1972 | Benson | |
| 4,796,818 | 1/1989 | Thoma | |
| 4,932,595 | 6/1990 | Cohen et al. | 241/99 |
| 4,934,614 | 6/1990 | Lewis | |
| 5,076,503 | 12/1991 | Cook | |
| 5,150,844 | 9/1992 | McKie | 241/73 |

Primary Examiner—Douglas D. Watts
Attorney, Agent, or Firm—David H. Semmes

[57] ABSTRACT

Waste disposal mechanisms, particularly a glass grinding machine for disposal of glass bottles or the like. The glass bottles are advanced through an inclined feeding chute onto a rotor having transverse blades which shatter the glass into fragments, and urge the glass fragments through a lower, arcuate grinding grate. Glass particles retrieved beneath the arcuate grinding grate may be used as building material or transported in their comminuted form to landfills at greatly reduced savings in bulk and handling.

2 Claims, 3 Drawing Sheets

GLASS GRINDING MACHINE

BACKGROUND OF THE INVENTION

1. Field of the Invention

Hard waste disposal, particularly a rotor and grinding grate for disposal of glass containers, such as soft drink bottles, beer bottles and the like.

2. Description of the Prior Art

| MOST PERTINENT PATENTS | |
|---|---|
| JOHNSON et al. | 2,558,255 |
| BEITER | 3,224,688 |
| LUSCOMBE | 3,655,138 |
| BENSON | 3,703,970 |
| LEWIS | 4,934,614 |
| BACKGROUND PATENTS | |
| HOWES | 1,973,074 |
| MORGAN et al. | 3,151,814 |
| THOMA | 4,796,818 |
| COOK | 5,076,503 |

The foregoing patents are being discussed in an Information Disclosure Statement, being submitted separately.

SUMMARY OF THE INVENTION

A glass grinding machine whereby glass bottles, such as soft drink or beer containers, may be readily comminuted or ground into small size particles. The particles may then be recycled as building material or conveniently disposed of with consequent savings in bulk load and transfer costs.

DESCRIPTION OF THE PREFERRED EMBODIMENTS

The present invention is characterized by the combination of a grinding rotor and adjacently supported arcuate grinding grate which in combination grind glass bottles and the like. A primary criticality is the configuration of the rotor with its transversely extending impact blades and its disposition with respect to the arcuate grinding grate. The grinding grate includes individual blades which are inclined with respect to the surface of the rotor and spaced apart at a sufficient distance to insure that the glass fragments are of the desired size.

Figure 1:
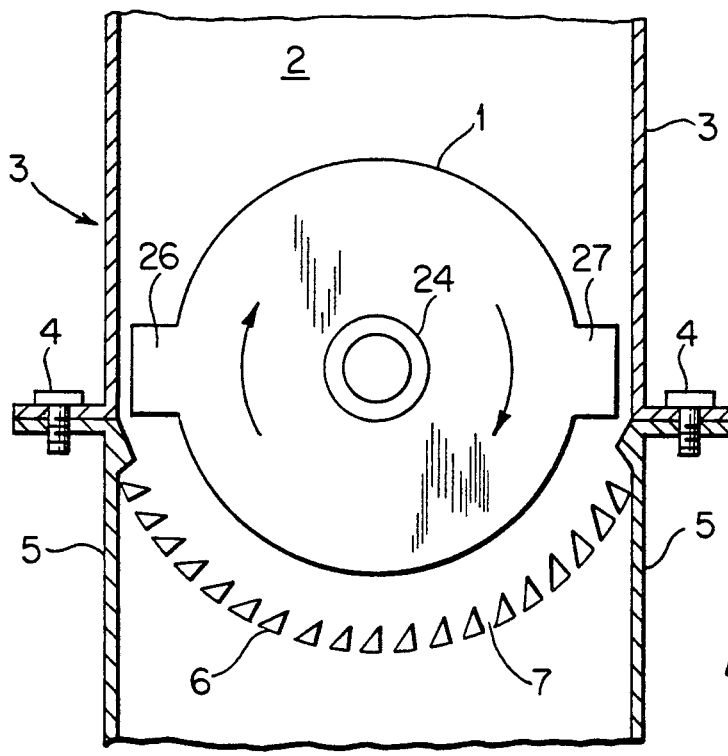
FIG. 1 is a fragmentary side elevation, partly in vertical section, showing the rotor and impact blades transversely disposed with respect to a lower arcuate grinding grate.

In FIG. 1 rotor 10 having transversely extending impact blades 26 and 27 is shown as supported upon rotor shaft 9 by means of key 10. The ends of shaft 9 may be supported in pillow block type bearings 24 by means of bearing supports 25. The illustrated housing includes grinding chamber 2, inclined feeding chute 3 bolted to a grinding grate section 5 by means of through bolts 4 or the like. The individual grinding grate blades 6 have an inclined surface, for example, 45 degrees with respect to the periphery of rotor 1. The spacing 7 between individual blades may be varied; however, it is suggested that for a rotor being rotated at speeds of 1700 to 2000 rpm, the spacing of blades at 1 inch increments would be appropriate.

Figure 2:
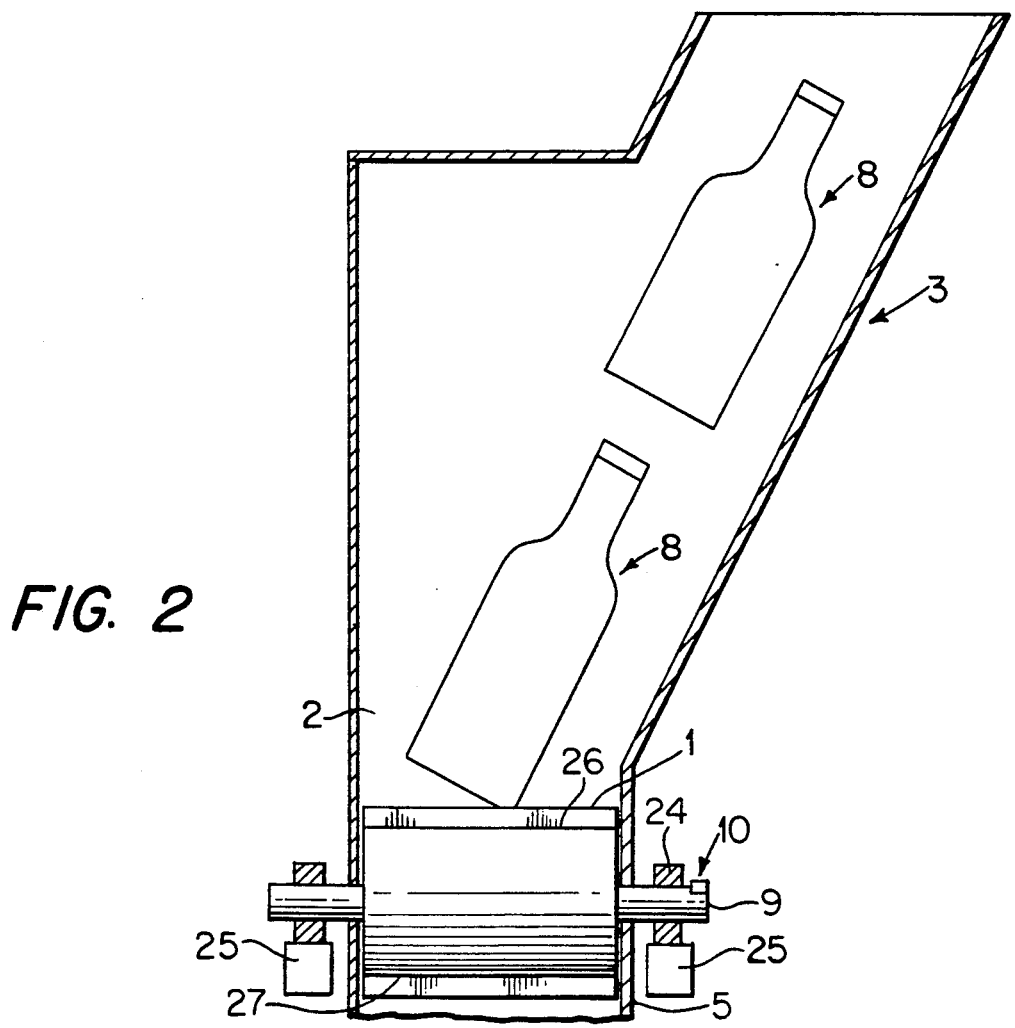
FIG. 2 is a front elevation, partially in section, showing the feeding of glass bottles upon an inclined feeding chute and onto the rotor blades.
Figure 3:
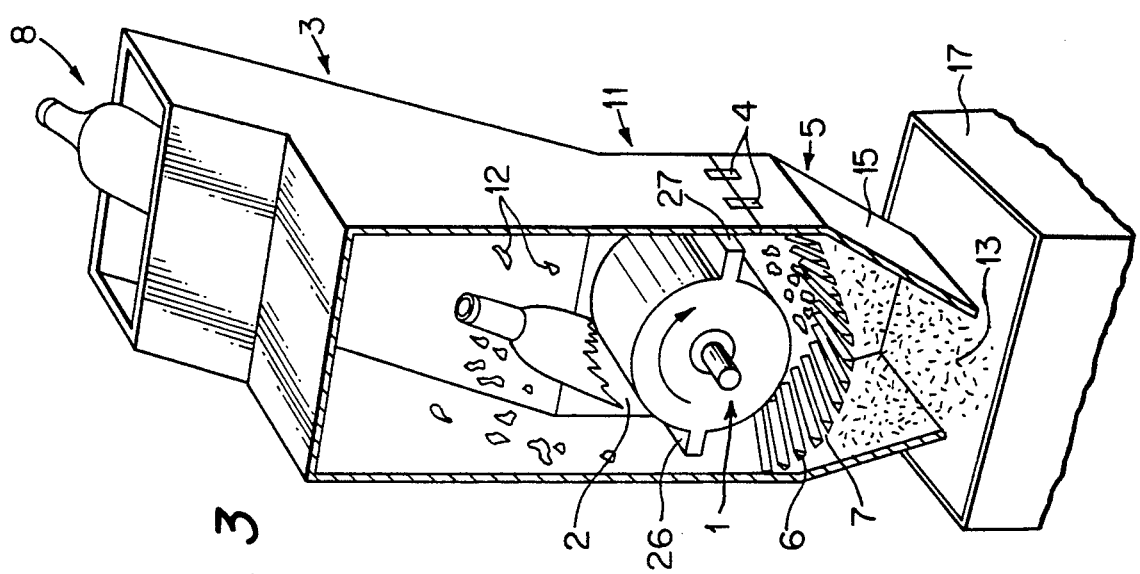
FIG. 3 is a perspective view, partially in section, showing breaking of the glass bottles upon contact with the rotor blades and prior to being forced through the grinding grate.

In FIG. 2 there is illustrated the gravity feeding of bottles 8 upon inclined feeding chute 3 and into grinding chamber 2. As rotor blade 26 impacts bottle 8 individual glass fragments 12 may be fed into the lower grate section of the housing. In practice, glass bottles 8 or the like may be dropped one at a time onto the inclined feeding chute 3, such that glass container 8 is broken upon impact with rotor blades 26, 27 and glass particles 12 are thrown against the grinding chamber wall 11 with such force that the glass particles 12 are broken again into smaller particles, falling into lower grate section 5. Rotor impact blades 26, 27, for example, rotating approximately ⅛" from grinding grate blades 6, then force smaller glass particles 12 against grinding grate individual spaced apart blades 6 and through grate outlets 7. As a result, fine glass particles in the form of sandy material 13, as illustrated in FIG. 3 are produced.

Figure 4:
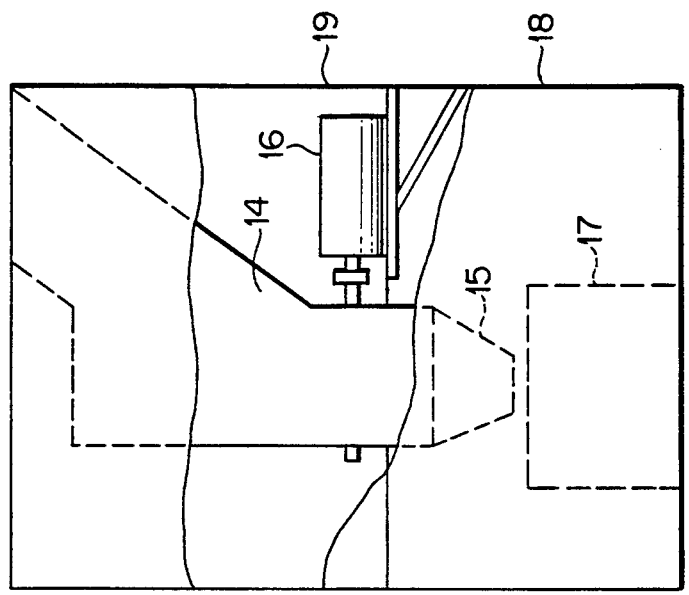
FIG. 4 is a front elevation, partially in section, showing the rotor drive means operatively disposed with respect to the rotor shaft.
Figure 5:
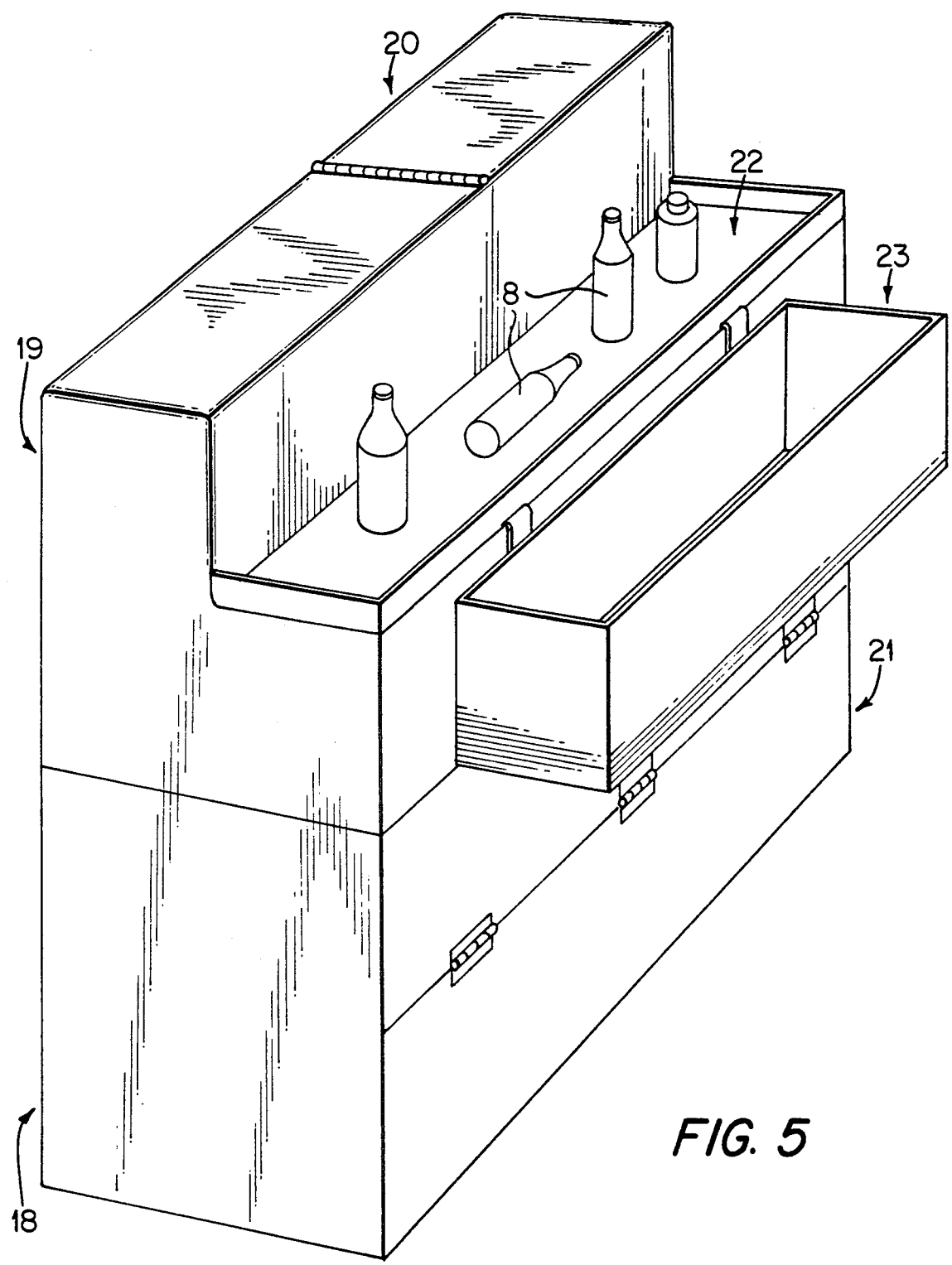
FIG. 5 is a perspective view, showing a housing for the glass grinding machine together with hinged top and hinged bottom closures, a glass bottle receiving tray and soft trash tray.

In FIG. 4 there is illustrated outlet funnel 15, rotor drive means in the form of electric motor 16 and a receiving container 17. The housing is illustrated as including machine base cabinet 18 with cover 19. In FIG. 5 the exterior of housing is illustrated together with cover 19, hinged feeding door 20 above inclined feeding chute 3, and hinged lower door 21 adjacent receiving container 17. A glass container holding tray 22 may be affixed to the top of the housing and a soft trash disposal tray 23 may also be employed.

In operation, bottle 8 enters the machine at an oblique angle with respect to rotor 1, keeping broken glass within the machine. If bottle 8 entered the machine at a vertical or straight down position, the broken glass might be thrust upwardly out of inclined chute 3 with consequent danger to the applicator.

When bottle 8 enters the machine and drops onto rotor 1, broken pieces 12 are thrown upwardly in the direction of rotor rotation against grinding chamber 11 wall, breaking the glass again into smaller pieces 12. Smaller pieces 12 fall onto the rotor and are forced through the grate. The distance between the rotor blades 6 inch grate is no more than ⅛". Grate outlets are ⅛" and are cut at a 45° angle. This angle facilitates rapid discharge of the glass material without plugging. This angle also contributes to producing a very fine sand product that will not cut or irritate the skin when rubbed into the operator's hands or even on the operator's facial area.

The suggested rotor speed is 1,750–2,000 rpm. Other impact grinders employ slower rotor speeds of no more than 900 rpm. Rotor blade height is approximately 2-¾".

Manifestly, various combinations of rotor and arcuate grinding grate may be employed without departing from the spirit of this invention, as defined in the claims.

I claim:

1. A glass grinding machine comprising:
   a) a housing, including an upper glass feeding section, a grinding chamber and a lower grate section, together with an inclined glass feeding chute supported in said housing upper glass feeding section above said grinding chamber;
b) a grinding rotor, rotatably supported within said housing grinding chamber, by means of a transverse axis extending through the grinding chamber into bearing supports at each end, said grinding rotor having a plurality of radially extending grinding blades;
c) a grinding grate supported within said housing grate section beneath and apart from said grinding rotor, said grinding grate including a plurality of spaced apart blades disposed in arcuate and complemental array with respect to said rotor radially extending grinding blades configured so as to define an oblique grinding surface with respect to the periphery of said rotor being approximately 45° with respect to the periphery of said rotor, and said blades being spaced apart approximately ⅛", said grinding grate further including an outlet funnel extending downwardly and away from said grinding grate together with a glass particle receiving container supported beneath said outlet funnel;
d) a rotor drive operably connected to said rotor, so as to rotate said rotor at such speed as to break glassware upon contact with said rotor and urge broken glass through said grinding gate, and
e) a glass container holding tray affixed to the exterior of said housing adjacent said inclined glass feeding chute.

2. A glass grinding machine as in claim 1, including a soft trash tray affixed to the exterior of said housing adjacent said glass container holding tray.

* * * * *